United States Patent
Rafferty et al.

(10) Patent No.: US 11,573,932 B2
(45) Date of Patent: *Feb. 7, 2023

(54) DYNAMIC DIRECTORY RECOMMENDATION AND MANAGEMENT

(71) Applicant: Capital One Services, LLC, McLean, VA (US)

(72) Inventors: Galen Rafferty, Mahomet, IL (US); Austin Walters, Savoy, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 226 days.

This patent is subject to a terminal disclaimer.

(21) Appl. No.: 17/002,884

(22) Filed: Aug. 26, 2020

(65) Prior Publication Data

US 2021/0133153 A1   May 6, 2021

Related U.S. Application Data

(63) Continuation of application No. 16/671,912, filed on Nov. 1, 2019, now Pat. No. 10,803,026.

(51) Int. Cl.
  *G06F 16/185*  (2019.01)
(52) U.S. Cl.
  CPC .................................. *G06F 16/185* (2019.01)
(58) Field of Classification Search
  CPC ...................................................... G06F 16/185
  USPC ........................................................ 707/829
  See application file for complete search history.

(56) References Cited

U.S. PATENT DOCUMENTS

| | | | |
|---|---|---|---|
| 6,582,474 B2 | 6/2003 | LaMarca et al. | |
| 6,985,905 B2 * | 1/2006 | Prompt | G06F 16/972 707/831 |
| 7,069,271 B1 * | 6/2006 | Fadel | G06Q 30/00 707/948 |
| 7,200,627 B2 | 4/2007 | Stickler | |
| 7,293,140 B2 | 11/2007 | Kano | |
| 7,840,619 B2 | 11/2010 | Horn | |
| 7,962,385 B2 * | 6/2011 | Falk | G06Q 10/10 705/35 |
| 8,082,322 B1 * | 12/2011 | Pascarella | G06F 9/541 709/219 |
| 8,473,532 B1 | 6/2013 | Ben | |
| 8,706,755 B2 | 4/2014 | Patel et al. | |
| 8,775,369 B2 * | 7/2014 | Largman | G06F 8/65 707/686 |

(Continued)

FOREIGN PATENT DOCUMENTS

EP   1678635 B1   10/2013

*Primary Examiner* — Hanh B Thai
(74) *Attorney, Agent, or Firm* — Perkins Coie LLP

(57) ABSTRACT

Systems and methods for generating a template directory based on an existing directory using the hierarchy of files in the directory. The system may use clustering analysis to determine similarities between items within the directory or files to generate a profile based on the characteristics of the saved items. The template directory may then be moved to another computing environment and items on the new computing environment may be arranged in a structure the mimics the existing directory. The system may update the profile of files in the directory dynamically as new items are created and saved within the computing environment hosting the template directory.

21 Claims, 6 Drawing Sheets

(56) References Cited

U.S. PATENT DOCUMENTS

| | | | |
|---|---|---|---|
| 9,104,742 B1* | 8/2015 | Wei | G06F 16/24532 |
| 9,418,090 B2 | 8/2016 | Auger | |
| 9,703,548 B2* | 7/2017 | Ledbrook | G06F 16/3329 |
| 9,720,999 B2* | 8/2017 | Carter | G06F 16/285 |
| 9,805,042 B1 | 10/2017 | Meyer | |
| 9,978,040 B2 | 5/2018 | Lee et al. | |
| 2001/0004260 A1* | 6/2001 | Bauer | G06F 3/0482 |
| | | | 345/418 |
| 2005/0015451 A1* | 1/2005 | Sheldon | H04L 51/212 |
| | | | 709/206 |
| 2005/0177824 A1 | 8/2005 | Kipman et al. | |
| 2008/0082959 A1* | 4/2008 | Fowler | G06F 9/44505 |
| | | | 717/104 |
| 2012/0096389 A1* | 4/2012 | Flam | G06F 16/168 |
| | | | 715/777 |
| 2012/0246207 A1 | 9/2012 | Evans et al. | |
| 2014/0310243 A1* | 10/2014 | McGee | G06F 16/27 |
| | | | 707/639 |
| 2015/0302077 A1* | 10/2015 | Carter | G06F 16/90 |
| | | | 707/740 |
| 2016/0012235 A1 | 1/2016 | Lee et al. | |
| 2016/0034305 A1* | 2/2016 | Shear | H04L 47/70 |
| | | | 707/722 |
| 2018/0025157 A1 | 1/2018 | Titonis et al. | |
| 2018/0196832 A1 | 7/2018 | Maybee et al. | |

\* cited by examiner

DYNAMIC DIRECTORY RECOMMENDATION AND MANAGEMENT

CROSS-REFERENCE TO RELATED APPLICATIONS

This application is a continuation of and claims the priority benefit of U.S. patent application Ser. No. 16/671,912, filed Nov. 1, 2019, which is also incorporated herein by its reference.

BACKGROUND

1. Technical Field

The present disclosure relates to an electronic file storage system that includes dynamic directory recommendation and management.

2. Introduction

Items and folders in a computing environment may be organized in several ways to maximize ease of use. However, files can easily get lost if they are not organized using a consistent method. When there are multiple users accessing items and folders on a directory or computing environment, inconsistent saving methods and organization structures can cause inefficiencies. Users may also change their saving patterns over time, and it may be difficult to find items and files that were saved at an earlier time. Additionally, files and directories may be nested several layers deep, and finding a save location for an item may be time consuming. It is advantageous to have a storage system that prompts a user with a save location that is consistent with single electronic file organization structure.

Storage systems containing multiple files can easily become unmanageable without a standardized method of saving. Additionally, when a file organization method is developed, it may be desirable to migrate that method and structure to other storage systems for ease of use, consistency, and efficiency. A system that automatically evaluates files in a file structure and suggests file storage locations and may make file storage structure and directories able to more efficiently store and retrieve electronic files.

SUMMARY

Disclosed are systems, methods, and non-transitory computer-readable storage media that provide a technical solution to the technical problem described. An electronic filing system configured to perform the concepts disclosed herein may comprise: a directory analyzer configured to: analyze items within an original file; identify an original file property based on similarities identified by cluster analysis; generate an original directory property based on similarities between the original file property and other properties of files within an original directory; and analyze a hierarchy of the original directory; a template directory generator configured to: create a mimic file; associate the original file property with the mimic file; create a template directory; associate the original directory property with the template directory; and arrange the mimic file in the template directory with the hierarchy of the original directory; a transportation device configured to move the template directory from a computing environment hosting the original directory to a new computing environment; a recommendation generator on the new computing environment configured to: evaluate an existing item that is stored on the new computing environment housing the template directory; identify an existing item property; correspond the existing item property with the original directory property; correspond the existing item property with the original file property; prompt a user to move the existing item to the mimic file in the template directory; and save the existing item to the mimic file when the user accepts a prompt; a save prompter configured to: evaluate a new item that has been created by the user working on the new computing environment housing the template directory; identify a new item property; correspond the new item property with the original directory property; correspond the new item property with the original file property; and prompt the user to move the new item to the mimic file in the template directory; and save the existing item to the mimic file when the user accepts the prompt; and a preference learner configured to: create a mimic file property based on the original file property; update the mimic file property when the existing item is saved to the mimic file; update the mimic file property when the new item is saved to the mimic file; replace the original file property with the mimic file property; create a mimic directory property based on the original directory property; update the mimic directory property when the new item is saved to the template directory; update the mimic directory property when the existing item is saved to the template directory; and replace the original directory property with the mimic directory property.

A electronic file method configured to perform the concepts described herein may comprise: analyzing a content of existing items within a first file located within a directory to identify similarities between existing items using clustering; creating a first file property based on similarities of the existing items within the first file; associating the first file property with the first file; analyzing an existing file within the directory and the first file to identify similarities between the first file and the existing file using clustering; creating a directory property based on similarities of the existing file and the first file; associating the directory property with the directory; analyzing the content of a new item to determine whether it has the directory property; associating the new item with the directory; determining whether the new item corresponds to the first file property; providing a user a recommendation prompt to save the new item to the first file when the new item corresponds to the first file property; saving the new item to the first file when the user accepts the recommendation prompt; generating an alarm when the new item is not saved to the first file; and updating the first file property and directory file property based on where the new item is saved.

A computer-readable storage medium configured as disclosed here may store instructions which, when executed by a computing device, causes the computing device to perform a method comprising: performing a clustering analysis on items in a file to determine a file profile; performing the clustering analysis on the file and additional files in a directory to identify a directory profile; identifying movement of a new item from a location in the directory; analyzing the new item and creating a new item profile; comparing the new item profile to the directory profile; selecting the directory if the directory profile corresponds with the new item profile; comparing the new item profile to the file profile; saving the new item in the file when the new item profile corresponds with the file profile; and updating the directory profile and the file profile based on content in the new item.

Additional exemplary features and advantages of the disclosure will be set forth in the description which follows, and in part will be obvious from the description, or can be learned by practice of the herein disclosed principles. The exemplary features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Figure 1:
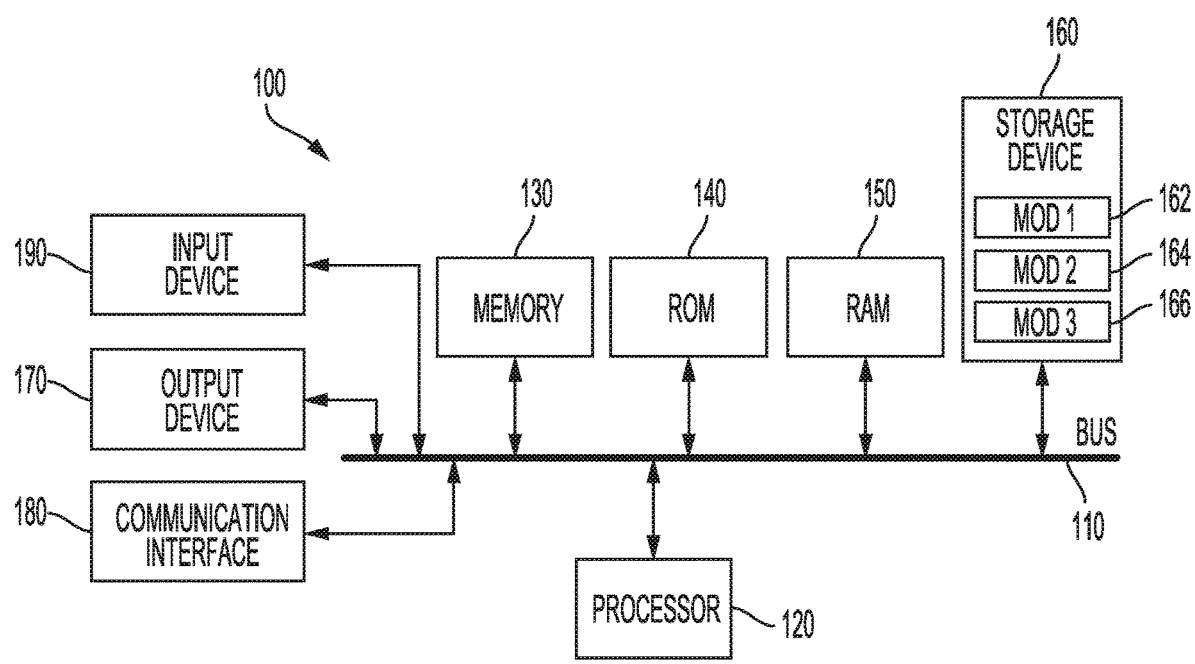
FIG. 1 illustrates an example system embodiment.

Various embodiments of the disclosure are described in detail below. While specific implementations are described, it should be understood that this is done for illustration purposes only. Other components and configurations may be used without parting from the spirit and scope of the disclosure.

The present disclosure is directed to methods, systems, and non-transitory computer-readable media for evaluating a file directory, creating a mimic directory, and dynamically creating storage locations for electronic files within an electronic file system. Most computer systems store a number of items, such as documents spreadsheets, programs, etc., that are organized into files and directories based on the content of the items. For example, a law firm may have a typical computing system that has a directory that may organize electronic files into sub-directories by types of clients. Client type directories may be further organized into specific client specific client directories. Specific client directories may then be further organized into files with different types of documents, for example, expenses, debts, budgets, and equity.

In another embodiment, a company may have an electronic document directory accessible to all employees. The directory may have a sub-directory divided by departments within the company. The department directory may be divided into sub-directories based on the job title of employees. The job title directory may further include a sub-directory divided by individual employees, and each individual employee may have their own directories and/or files.

It is advantageous to have a storage system that uses a save location that is consistent with an electronic file organization structure. In some embodiments, the system may use machine learning to learn the storage locations of electronic files for a group of users, an individual, or entity. The storage locations may be used to provide save locations that are consistent with previous saving habits or the electronic file storage system. Clustering analysis may be used to determine the similarities between items in a folder or directory location or sub-folders within a folder. These structures may be several layers deep and a clustering analysis may be done at every level. Using clustering analysis, files which are often opened at the same time can be clustered in the same folder. In some embodiments, images, or files of similar extension types may be parsed and clustered based on words, images, and other features. For instance, a user may download and save receipts in a receipts folder. If a user downloads a new receipt, the file containing the receipt may be dropped into a 'downloads' folder. The storage system may parse the receipt file and may cause a notification to popup that reads "Would you like to put receipt in folder marked 'receipts.'" Saving similar files at the same or consistent locations improves ease of retrieval and system integrity.

When a prompt to save an item at the recommended save location is accepted or rejected, the clustering analysis may be performed again to make the predictions or recommendations more accurate. In further embodiments in addition or instead of providing a prompt, an alarm or warning may be provided when a file is moved or saved to a location that is inconsistent with the previous saving habits or system structure.

Additionally, computers may access multiple storage areas or databases. It may be advantageous to have a similar structure across multiple platforms or computing environments. Thus, the computer system can efficiently locate electronic files in both databases. The structure on one platform may be analyzed and mimicked on a second platform. In some embodiments, the structure may be created by evaluating the structure of the current system and creating a mimic structure that mimics the hierarchy of a different electronic file system. For example, a user has three computers: a work laptop, a personal computer, and a work desktop. The storage system may learn the saving profile of the user on the work laptop and transfer that profile to the personal computer and work desktop. In other embodiments, the learned saving profile may be based on all three computers. The saving profile may cluster files on the work laptop in a hierarchy (folders) and predict where a file on the work desktop or personal computer would fit in that hierarchy. The work desktop or personal computer may then generate file save location recommendations based on the storage profile generated from the work laptop.

A clustering analysis may be performed on the lowest level of the electronic file system hierarchy to determine the similarities or shared characteristics of the items in a location or file. This may be done on every level of the electronic file system. In some embodiments, each file within the electronic file system may be provided a profile or property that describes the items within the file. For example, if there are multiple items in a file, the items may be analyzed and the file may be given a property or a profile based on these items.

With reference to FIG. 1, an exemplary system includes a general-purpose computing device 100, including a processing unit (CPU or processor) 120 and a system bus 110 that couples various system components including the system memory 130 such as read-only memory (ROM) 140 and random access memory (RAM) 150 to the processor 120. The computing device 100 can include a cache of high-speed memory connected directly with, in close proximity to, or integrated as part of the processor 120. The computing device 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, system bus 110, an output device 170 that might be a display, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 100 is a small, handheld computing device, a desktop computer, or a computer server.

Although the exemplary embodiment described herein employs the storage devices 160 that may be a hard disk, other types of computer-readable media which can store data that are accessible by a computer, such as magnetic cassettes, flash memory cards, digital versatile disks, cartridges, random access memories (RAMs) 150, and read-only memory (ROM) 140, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

Figure 2A:
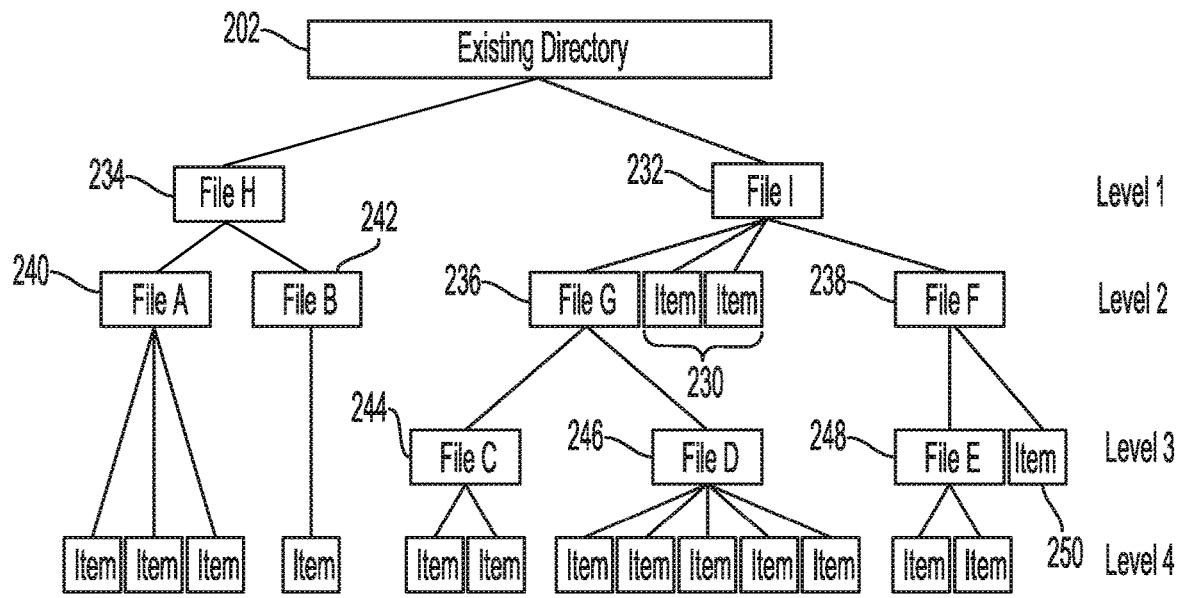
FIG. 2A illustrates an example embodiment arrangement.
Figure 2B:
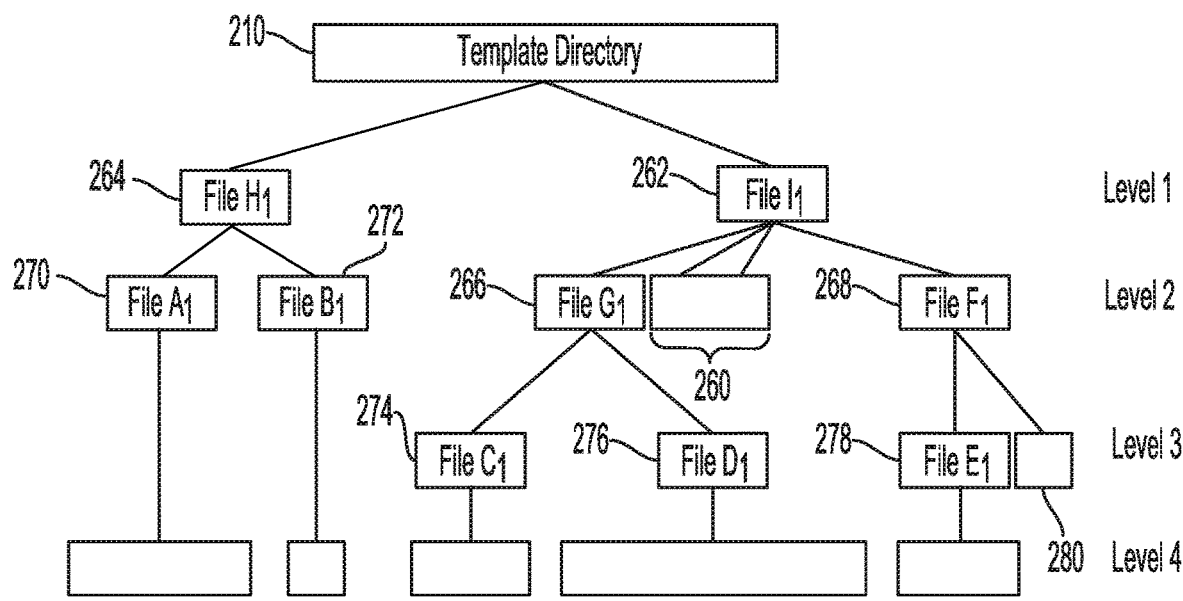
FIG. 2B illustrates an example embodiment arrangement.

FIG. 2A is an example of existing directory 202. FIG. 2B is an example of template directory 210. The existing directory 202 may have File H 234 and File I 262. These may be represented in template directory 210 as File $H_1$ 264 and File $I_1$ 262. File H 234, File I 262, File $H_1$ 264, and File $I_1$ 262 may be located in the existing directory and template directory and may be considered to be on level 1 of the directory hierarchy. File H may have sub-files, File A 240 and File B 242. The sub-files may be represented in the template directory 210 by File $A_1$ 270 and File $B_1$ 272, which may be sub-files of File $H_1$ 264. File $A_1$ 270, File $B_1$ 272, File A 270, and File B 272 may be nested and may be considered to be on a second level because they are one level removed from the directory. File I 262 in the mimic directory may have sub-files, File F 238 and File G 236 at a third level of the directory. File I 262 may also have items 230 located at this level. Sub-files File F 238 and File G 236 may be mimicked in the template directory by sub-files File $F_1$ 268 and File $G_1$ 266. File $I_1$ may also reserve space for items as represented by 260. File G may have sub-files File C 244 and File D 246. Sub-files File C 244 and File D 246 may be mimicked by File $C_1$ 274 and $D_1$ 276 in the template directory. File C 244, File D 246, File $C_1$ 274, and $D_1$ 276 may be considered to be at a third level of their directory. Similarly, files located in File F 238 or $F_1$ 268 may be considered to be at a third level of the directory, such as File E 248 and File $E_1$ 278. Item 250 may not be mimicked in the template directory, however, File $F_1$ may have a profile based on the properties or characteristics of File F (or the items stored within) and item 250. Items stored in the folders or files located on the third level may be considered to be on a fourth level. Items may not be mimicked in the template directory 210, however, as explained above, the characteristics of these items may define a profile of the file corresponding to their parent file in the template directory 210.

Figure 2C:
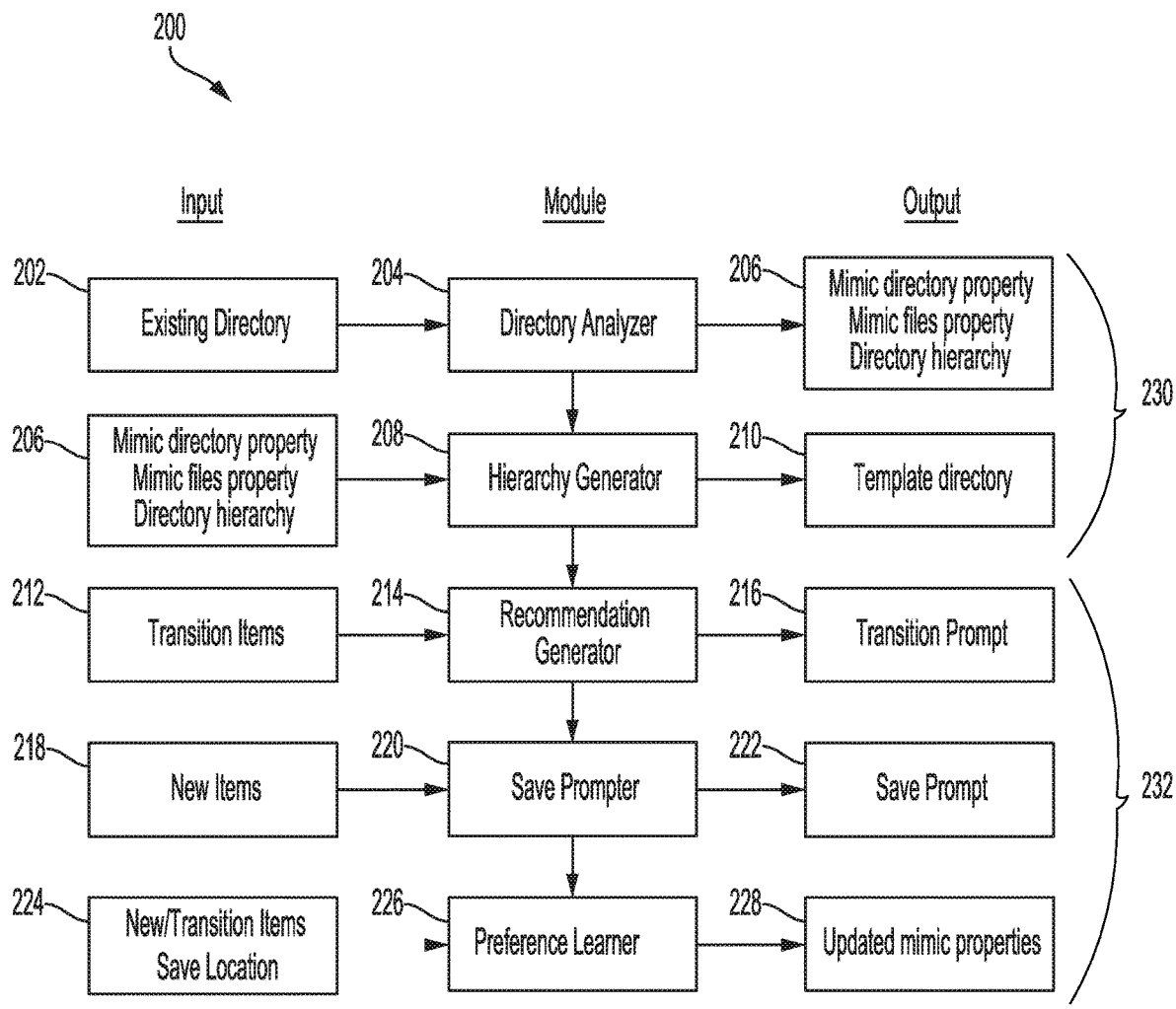
FIG. 2C illustrates an example embodiment arrangement.

FIG. 2C depicts an example embodiment of the arrangement 200. A directory may exist on a computing environment. The directory may be replicated or mimicked for implementation on a new environment. The directory may have files and sub-files that may be arranged in a desired hierarchy. In one example, an input from an existing directory 202 is provided to a directory analyzer 204. Directory analyzer 204 outputs a mimic directory 206 that mimics the file structure of the existing directory 202. The mimic directory 206 may have the same hierarchy as existing directory 202. The mimic directory may contain folders and sub-folders that may have characteristics or profiles that identify or describe the items, files, item characteristics, or file characteristics of the items or files located within the existing directory 202. The properties associated with mimic files may be mimic properties 228. For example, if a file in the existing directory 202 includes files relating to audits, a file in the mimic directory 206 may have an audit file. The audit file may have a file profile that is derived from the characteristics of items within the audit file. These characteristics may be determined based on a clustering or character analysis that identifies similarities between items in the audit file.

In this example, the audit file may be within another file, such as a financials file. The financials file may be associated with characteristics of the audit file as well as other files within the financials file. In other embodiments, the financials file may be associated with characteristics of the items within all of the sub-files. For example, the financials file may have a sub-file of invoices. The invoice sub-file may be associated with the characteristics of items within the invoices file to generate a profile of the invoice file. The financials file may then generate a profile based on the profile of the audit and invoice sub-files. In other embodiment, the financials file may have a profile based on the characteristics of the items in its sub-files, such as the audit sub-file and invoice sub-file. This may be done using clustering or character analysis. For example, hierarchical clustering analysis may be used. The clustering analysis may have a machine learning model which may create an embedding per document type, in other words, learned similarity relationship between files. In other embodiments, the machine learning model may perform a distance metric based on file type, access pattern, and/or most common words in each file.

The mimic directory 206 profile may then be provided to a hierarchy generator 208. The hierarchy generator may arrange all files, directories, and/or sub-files into a hierarchy similar to the existing directory 202. The output of the hierarchy generator 208 may be a template directory 210. The template directory 210 may include the structure or hierarchy of the existing directory 202 but may not contain the items. The template directory may also include the profiles of the directories and files of the existing directory 202 and associate the profiles with the directories and files of the template directory 210.

Transition items 212 may exist on a second system 232. The transition items may include anything that is currently stored on the second system 232 that is to be integrated into the template directory 210. The second system may be a server or computing environment that is different from the system that hosts the existing directory 202. The template directory 210 may be provided to the second system 232, for example, over an internet connection intranet, or via mobile memory. The template directory 210 may be downloaded or incorporated onto the second system 232. The template directory may include a number of transition items 212. The transition items 212 may be in a file or directory structure or hierarchy that is dissimilar or unrelated to the existing directory 202. The transition items 212 may be provided to the recommendation generator 214. The recommendation generator may be a module of arrangement 200. The recommendation generator 214 may evaluate the transition items 212 using the profile associated with the directories, files, or sub-files of the template directory 210. The recommendation generator 214 may then generate a transition prompt 216 to move the transition items 212. The transition items 212 may then be moved to the corresponding files in the template directory 210. In some embodiments the transition prompt 216 may be sent to a user who may choose to accept or refuse the transition prompt 216. In other embodiments, the prompts may be received by the second system 232 and may automatically move the transition items 212 to the directory, file, or sub-file generated by the recommendation generator 214.

In still further embodiments the transition items 212 may be provided to a secondary system to perform an analysis to determine whether the recommendation generator 214 created an accurate transition prompt 216. The secondary system may determine that the transition prompt 216 is accurate based on the transition items 212 being consistent with the profile of a directory, file, or sub-file within a known degree of certainty. If the transition items 212 are not consistent with the directory, file, or sub-file within a known degree of certainty, the transition items 212 may be sent to another system or individual to determine whether the transitions items 212 should be relocated. The recommendation generator 214 may create recommendations for transition items 212 located on the second system 232 and the items. The transition items 212 may be saved in the corresponding files of the template directory 210 located on the second system 232. The corresponding file may be determined based on the content, metadata, location, or name of the transition items 212.

New items 218 may be generated by a user on the second system 232. New items 218 be provided to a save prompter 220. The new items 218 may be generated on the second system 232 that hosts the template directory 210. The new items 218 may have characteristics that may be evaluated by the arrangement 200. The new items 218 may be matched to a profile associated with a directory, file, or sub-file based on the characteristics of the new items 218 that may be generated on the second system 232. The arrangement 200 may evaluate the new items 218 using any of the methods known in the art. The new items may then be compared to the profile of the directories, files, or sub-files in the template directory. A save prompt 222 to save the new items 218 to a location corresponding with the characteristics of new items 218 may be generated when the new items 218 have characteristics that correspond to a profile above a degree of certainty.

The user may choose to accept the save prompt 222 or it may save the new items 218 to a different location. The location where the transition items 212 and/or the new items 218 are saved may be the save location. The save location and the characteristics of the new items or transition items 224 may be provided to a preference learner 226. The preference learner 226 may evaluate the characteristics of the transition items 212 and/or the new items 218 and update the profile of the directory, file, or sub-file that was chosen. The updated profile may be used to update the mimic properties 228 that are associated with the directory, file, or sub-file within the template directory 210.

Figure 3:
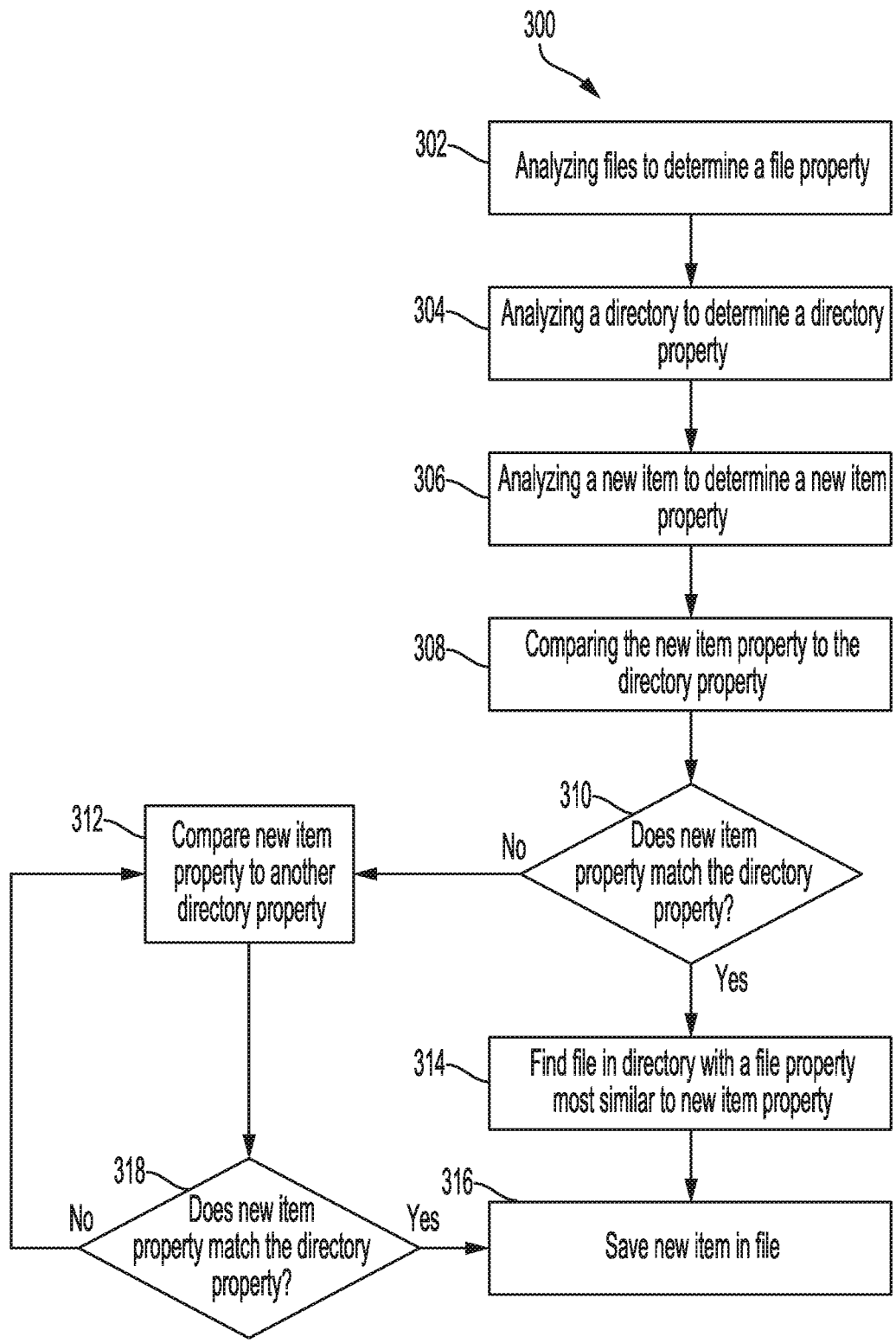
FIG. 3 illustrates an example method embodiment.

FIG. 3 is an exemplary method. Method 300 analyzes a directory to determine a directory property at 302. Directory property 302 may be characteristics about items to be stored in the directory. For example, the directory property 302 may be that the items were created by a specific user. The directory may be located on a computing environment and may contain a number of files arranged in a hierarchy. The file property may be based on the items within the file and may be determined using clustering analysis of the items within the file. At 304 the method may analyze the files within the directory to determine a common characteristic or series of common characteristics. It may then determine a directory property based on those characteristics.

At 308 the method may recognize that a new item is being saved. The new item may be created on the computing environment, for example, in a word processing application.

In other embodiments, the method may detect that an item that is stored somewhere on the computing environment is being moved from a location. For example, a user may have selected the item and is dragging the item to another location. When this is detected the method may determine the properties of the item as described above. In other embodiments the method may have the properties of the new item saved and may retrieve the new item's properties from a database. The new item properties may be compared to the properties of existing files. If the new item has properties that correlate to the properties of an existing file at 314, the method may save the new item to that existing file at 316. If the new item does not correspond to properties of existing files, the method may determine whether the new item corresponds to a directory property at 318. If the new item property corresponds to the directory property at 318, the new item may be saved in the corresponding directory. This may be advantageous when the new item is similar to the directory profile but does not correspond to a file in the directory. For example, the directory may be a real estate development, and the folders may be electrical blue prints and piping blue prints. If a file is received that is an excavation blue print, the may be saved to the development directory but not saved to the pipping blue print or electrical blue print file but may be saved at the same level as those files. In some embodiments, the items in the directory may be routinely queried to determine if they share a common characteristics. The method may then generate a prompt to create a file including the appropriate items. In other embodiments, the method may automatically generate a file for items having a common characteristic and move the corresponding items into the file.

Figure 4:
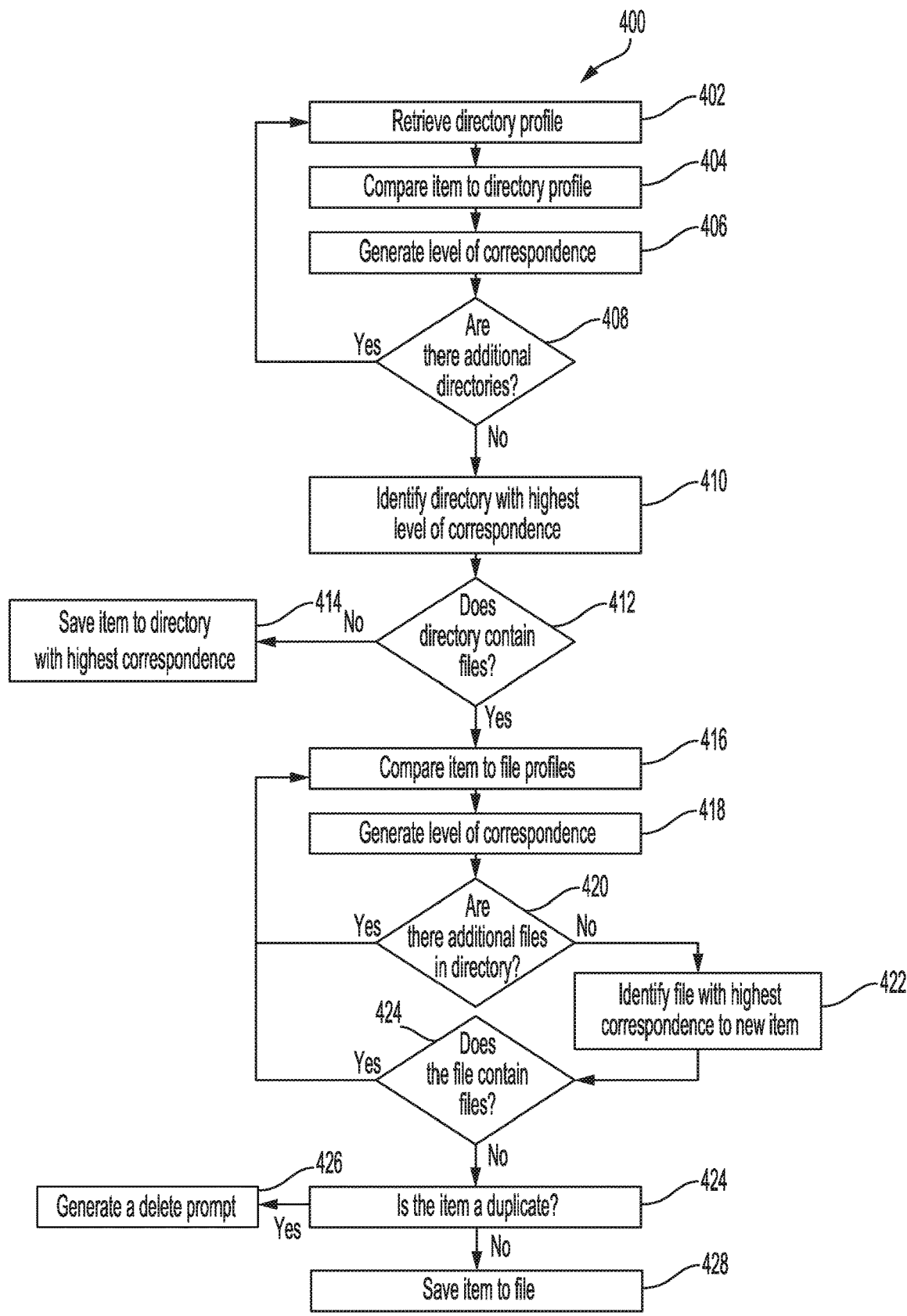
FIG. 4 illustrates an example method embodiment.

FIG. 4 is an exemplary method. Method 400 may retrieve a directory profile at 402 that defines a characteristic of items to be stored in the directory. The profile may be created to identify items that are specific to the directory. This may be done using a program known in the art to parse items to identify characteristics of the item, such as words, word patterns, images, or numbers. At 404 the item may be compared to the directory profile at 404. At 406 a level of correspondence between the item and the directory profile may be generated. This may be based on a program that compares a number of characteristics of the item to the profile. At 408 the method may determine if there are additional directories available within the computing environment. If additional directories exist, the method 400 may return to 402 to determine the level of correspondence between the item and the additional directories at 406. If there are no additional directories at 408, the method may move to 410 where the method may determine which directory has the highest level of correspondence. At 412 the system will determine if there are files within the directory. If there are no files within the directory, the item may be saved to the directory with the highest level of correspondence at 414. If there are files in the directory, the characteristics of the item may be compared to the profile of the files within the directory at 416. At 418, a level of correspondence between the item and the files may be determined. The level of correspondence may be generated in a way similar to that generated at 406.

At 420, the method 400 may determine if there are any additional files within the directory. If there are additional files in the directory, the method may return to 416 and compare the item to the profile of the additional files to the characteristics of the item. The method may continue so that a level of correspondence is identified for all files in the directory. At 424 the method may determine whether there are sub-files within the file. If there are sub-files at 424, the method may return to 416. After a level of correspondence has been generated for all files in the directory, the method may move to 422 where it may be determined which file in the directory has the highest level of correspondence with the item. When the file with the highest level of correspondence with the item has been identified at 422, it may be determined whether the file with the highest correspondence with the item includes sub-files at 424. If the file does not have sub-files at 424, the item may be saved to that file at 426. In other embodiments, before saving the file at 426, the method 400 may determine if items exist that correspond to the current item. This may indicate that the item is a duplicate of items stored in the computing environment, in some embodiments, when a duplicate is identified, the method may create a prompt for the user to delete the duplicate item to avoid confusion or unnecessary memory space.

Figure 5:
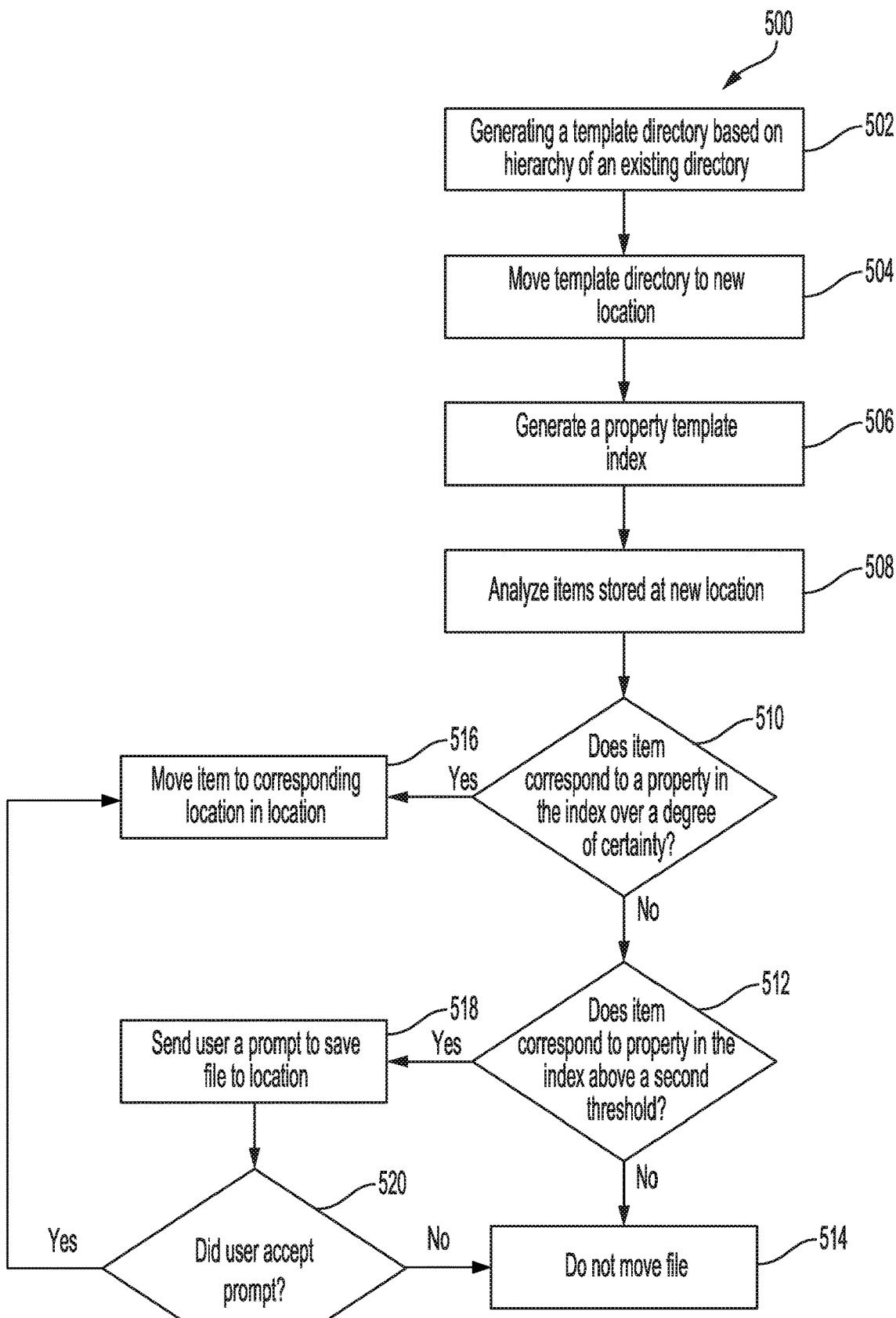
FIG. 5 illustrates an example method embodiment.

FIG. 5 depicts an exemplary method. Method 500 may begin by generating a template directory based on the hierarchy of an existing directory at 502. Method 500 may move the template directory generated at 502 to a new location at 504. The new location may be a separate computing environment or a different server. The template directory may be moved using an internet connection or via removable memory.

At 506, the method may generate a template directory index. The template directory index may have descriptions or characteristics of items that correspond with the file. It may include a location pointer to the file location. At 508, new items located on the separate computing environment or server may be analyzed. In some embodiments, some items on the separate computing environment may have a flag indicating that they should not be analyzed or moved. This may be a permanent flag that may be generated and associated with the item based on metadata of the item, the content of the item, or may be manually set by the user for the item. At 510, the method may determine whether the content of the item corresponds to a property of a file in the index above a degree of certainty. If the item does correspond to a file as characterized in the index above a degree of certainty, the item may be saved to that file at 516. If the item does not correspond to a file above a degree of certainty, it may be determined if the item corresponds to a second degree of certainty at 512 that may be lower than the degree of certainty used at 510. If the item is above the second degree of certainty, a prompt may be provided to a user to save the item to the file location. If the item does not correspond to a file above a second degree of certainty, the item may not be moved at 514. This may be advantageous so that items that are likely to correspond to a file or location can be moved automatically without requiring input from the user. Additionally, it may allow the user to make a determination of the appropriate file or location when it is less clear where the item should be saved. If the prompt generated at 518 is accepted at 520, the item may be saved to the file or location at 516. If the prompt is not accepted at 520, the file may remain in its current location at 514. In some embodiments, when an item is saved to a file location at 516, the file property associated with the file in the index may be updated to reflect the new item. This may be done by performing an additional clustering analysis and/or using machine learning techniques. In further embodiments, if a prompt to save a file to a recommended location is not chosen, the property may be updated to reflect what items do not belong in the file. The property may be continually updated to reflect the user saving decisions to improve accuracy over time. In other embodiments, the property may be updated based on the items in the folder when an update instruction is received by the system or user.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

The invention claimed is:

1. An electronic file system, comprising:
  a directory analyzer configured to:
    analyze items within an original file;
    identify an original file property based on similarities identified by cluster analysis;
    generate an original directory property based on similarities between the original file property and other properties of files within an original directory hosted on an original environment; and
    analyze a hierarchy of the original directory; and
  a template directory generator configured to:
    create a mimic file;
    associate the original file property with the mimic file;
    create a template directory;
    associate the original directory property with the template directory;
    arrange the mimic file in the template directory with the hierarchy of the original directory; and
  a recommendation generator configured to:
    evaluate an existing item that is stored on a new computing environment housing the template directory;
    identify an existing item property;
    correspond the existing item property with the original directory property;
    correspond the existing item property with the original file property;
    prompt a user to move the existing item to the mimic file in the template directory; and
    save the existing item to the mimic file when the user accepts a prompt.

2. The electronic file system of claim 1, further comprising a transportation device configured to move the template directory from the computing environment hosting the original directory to the new computing environment.

3. The electronic file system of claim 1, further configured to save the existing item to the template directory when the existing item does not correspond to a mimic file property file in the template directory.

4. The electronic file system of claim 1, further comprising a save prompter configured to:
  evaluate a new item that has been created by a user;
  identify a new item property;
  correspond the new item property with the original directory property;
  correspond the new item property with the original file property; and
  prompt the user to move the new item to the mimic file in the template directory.

5. The electronic file system of claim 4, further comprising saving the new item to the mimic file when the new item property corresponds to the original file property over a degree of certainty.

6. The electronic file system of claim 1, further comprising a preference learner configured to:
  create a mimic file property based on the original file property;
  update the mimic file property when an existing item is saved to the mimic file;
  update the mimic file property when a new item is saved to the mimic file;
  replace the original file property with the mimic file property;
  create a mimic directory property based on the original directory property;
  update the mimic directory property when the new item is saved to the template directory;
  update the mimic directory property when the existing item is saved to the template directory; and
  replace the original directory property with the mimic directory property.

7. The electronic file system of claim 1, wherein the template directory is located on a different server than the original directory.

8. The electronic file system of claim 1, further comprising saving a new item to the template directory when the new item does not correspond to the original file property.

9. The electronic file system of claim 1, wherein the template directory is a file.

10. The electronic file system of claim 1, further configured to provide a duplicate prompt when a duplicate item is identified in the mimic file.

11. An electronic file system, comprising:
  analyzing items within an original file to identify an original file property based on similarities identified using cluster analysis;
  generating an original directory property based on similarities between the original file property and other properties of files within an original directory hosted on an original environment;
  analyzing a hierarchy of the original directory;
  creating a mimic file that associates the original file property with the mimic file;
  creating a template directory that associates the original directory property with the template directory;
  arranging the mimic file in the template directory with the hierarchy of the original directory;
  evaluating an existing item that is stored on a new computing environment housing the template directory;
  identifying an existing item property;
  corresponding the existing item property with the original directory property;
  corresponding the existing item property with the original file property;
  prompting a user to move the existing item to the mimic file in the template directory; and
  saving the existing item to the mimic file when the user accepts a prompt.

12. The electronic filing method of claim 11, further moving the template directory from the computing environment hosting the original directory to the new computing environment.

13. The electronic filing method of claim 11, further saving the existing item to the template directory when the existing item does not correspond to a mimic file property file in the template directory.

14. The electronic filing method of claim 11, further:
  evaluating a new item that has been created by a user;
  identifying a new item property;
  corresponding the new item property with the original directory property;

corresponding the new item property with the original file property; and prompting the user to move the new item to the mimic file in the template directory.

15. The electronic filing method of claim 14, further saving the new item to the mimic file when the new item property corresponds to the original file property over a degree of certainty.

16. The electronic filing method of claim 11, further:

creating a mimic file property based on the original file property;

updating the mimic file property when an existing item is saved to the mimic file;

updating the mimic file property when a new item is saved to the mimic file;

replacing the original file property with the mimic file property;

creating a mimic directory property based on the original directory property;

updating the mimic directory property when the new item is saved to the template directory;

updating the mimic directory property when the existing item is saved to the template directory; and replacing the original directory property with the mimic directory property.

17. The electronic filing method of claim 11, wherein the template directory is located on a different server than the original directory.

18. The electronic filing method of claim 11, further saving a new item to the template directory when the new item does not correspond to the original file property.

19. The electronic filing method of claim 11, wherein the template directory is a file.

20. The electronic filing method of claim 11, further providing a duplicate prompt when a duplicate item is identified in the mimic file.

21. A computer-readable storage medium storing instructions which, when executed by a computing device, causes the computing device to perform a method comprising:

analyzing items within an original file to identify an original file property based on similarities identified using cluster analysis;

generating an original directory property based on similarities between the original file property and other properties of files within an original directory hosted on an original environment;

analyzing a hierarchy of the original directory;

creating a mimic file that associates the original file property with the mimic file;

creating a template directory that associates the original directory property with the template directory;

arranging the mimic file in the template directory with the hierarchy of the original directory;

evaluating an existing item that is stored on a new computing environment housing the template directory;

identifying an existing item property;

corresponding the existing item property with the original directory property;

corresponding the existing item property with the original file property;

prompting a user to move the existing item to the mimic file in the template directory; and saving the existing item to the mimic file when the user accepts a prompt.

* * * * *